KAIICHIRO SAKAZUME
SHIGEMASA ITOH
SHUI SATO
EIICHI SAKAMOTO
INVENTORS.

BY Bierman & Bierman
ATTORNEYS

United States Patent Office 3,625,698
Patented Dec. 7, 1971

3,625,698
LIGHT-SENSITIVE SILVER HALIDE PHOTO-
GRAPHIC MATERIAL SENSITIZED WITH A
THIOHYDANTOIN NUCLEUS CONTAINING
DYE
Kaiichiro Sakazume, Shigemasa Itoh, and Shui Sato, Tokyo, and Eiichi Sakamoto, Hanno-shi, Japan, assignors to Konishiroku Photo Industry Co., Ltd.
Filed June 14, 1968, Ser. No. 737,147
Claims priority, application Japan, June 20, 1967, 42/39,037; Aug. 25, 1967, 42/54,205
Int. Cl. G03c 1/08
U.S. Cl. 96—100     5 Claims

ABSTRACT OF THE DISCLOSURE

The photographic material emulsion layer contains a sensitizing dye. The dye has the formula:

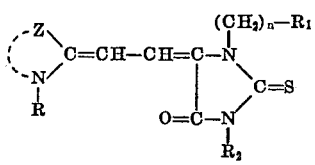

Figure 1:
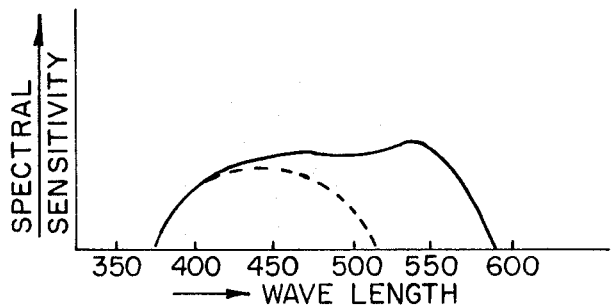

wherein R is an alkyl group, a carboxy alkyl group or a sulfo alkyl group; $R_1$ is hydroxy, cyano, alkoxy, carboxy, acyloxy or carbamoyl; $n$ is an integer of 2 to 3; $R_2$ is a substituted or unsubstituted alkyl, aryl, alkenyl or aralkyl; and Z means an atomic grouping capable of forming, together with the adjacent nitrogen and carbon atoms, a benzoxazole ring, a naphtho-oxazole ring, a thiazole ring, and indolenine ring or a quinoline ring.

This invention relates to a light-sensitive silver halide photographic material, characterized by that it contains, as an ingredient for its photographic emulsion layer, a new polymethine-merocyanine dye having a thiohydantoin nucleus, said dye being a new compound of the general formula

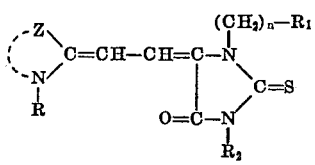

wherein R is unsubstituted or substituted alkyl; $R_1$ is hydroxy, cyano, alkoxy, carboxy, acyloxy or carbamoyl; $n$ is an integer of 2 to 3; $R_2$ is unsubstituted or substituted alkyl, aryl, alkenyl or aralkyl; and Z means an atomic grouping capable of forming, together with the adjacent nitrogen and carbon atoms, a 5- or 6-membered heterocyclic nucleus, this heterocyclic nucleus being able to contain a substituent.

Various sensitizing dyes have been known in the photographic art. Some of them are excellent in sensitizing action but tend to cause an increase of fog. Further, almost all of the known sensitizing dyes suffer from the decrease of sensitiveness during the storage of the film product.

It is accordingly an object of the present invention to provide a new sensitizing dye having well balanced properties useful for photography. It has now been found that a new polymethine merocyanine dye having a particular thiohydantoin nucleus when it is incorporated in the photographic emulsion layer of a photographic material is entirely free from the decrease of photographic sensitivity during the storage of the photographic material and safe from color staining of the photographic emulsion layer after development, while it exhibits good sensitizing effect.

Below are typical compounds of the general formula used in this invention.

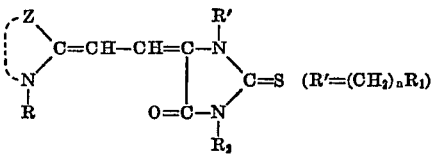

| Compound No. | 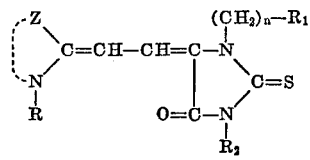 | R | $R_2$ | R' | Melting point (° C.) | $\lambda_{max.}$ (m$\mu$) (in MeOH) |
|---|---|---|---|---|---|---|
| (1) | benzoxazole | —$C_2H_5$ | phenyl | —$CH_2CH_2OH$ | 278–281 | 492 |
| (2) | Same as above | —$CH_3$ | —C₆H₄—Cl | Same as above | 277–279 | 496 |
| (3) | ...do... | —$C_2H_5$ | phenyl | —$CH_2CH_2OCOCH_3$ | 1 250–252 | 492 |
| (4) | naphtho-oxazole | —$CH_2CH_2COOH$ | Same as above | —$CH_2CH_2OH$ | 235–238 | 493 |

TABLE—Continued

| Compound No. | ⟨Z-C / N⟩ | R | R₂ | R' | Melting point (°C.) | λ max. (mµ) (in MeOH) |
|---|---|---|---|---|---|---|
| (5) | CH₃O-benzoxazole-C= | —C₂H₅ | —CH₂CH₂CH₃ | Same as above | 206–208 | 502 |
| (6) | benzoxazole-C= | —CH₂CH₂COOH | —C₆H₅ | ...do... | 233–235 | 490 |
| (7) | CH₃-benzoxazole-C= | —C₂H₅ | —CH₂CH₂CH₃ | ...do... | 250–252 | 496 |
| (8) | Same as above | Same as above | Same as above | —CH₂CH₂OCOCH₃ | 182–185 | 495 |
| (9) | CH₃O-benzoxazole-C= | ...do... | —C₆H₅ | —CH₂CH₂OH | 265–267 | 505 |
| (10) | CH₃O-benzoxazole-C= | —CH₂CH₂COOH | Same as above | Same as above | 225–227 | 496 |
| (11) | Same as above | —C₂H₅ | —C₆H₄Cl | ...do... | 250–253 | 499 |
| (12) | benzoxazole-C= | —CH₂CH₂COOH | Same as above | ...do... | 246–248 | 490 |
| (13) | Same as above | Same as above | —CH₂CH₂CH₃ | ...do... | 221–223 | 487 |
| (14) | (CH₃)₂-benzoxazole-C= | —C₂H₅ | —C₆H₅ | ...do... | 286–289 | 501 |
| (15) | Same as above | Same as above | —C₆H₄Cl | ...do... | 277–279 | 501 |
| (16) | benzoxazole-C= | —CH₂CH₂CH₂CH₂SO₃HN(pyridinium) | —C₆H₅ | ...do... | 205–207 | 488 |
| (17) | phenyl-benzoxazole-C= | —CH₂CH₂CH₂CH₂SO₃HN(pyridinium) | Same as above | ...do... | 242–245 | 496 |
| (18) | quinoline= | —C₂H₅ | ...do... | ...do... | 222–225 | 635 |
| (19) | benzothiazole-C= | —CH₃ | ...do... | —CH₂CH₂OCOCH₃ | ¹ 285–287 | 528 |

| Compound No. | ![Z-C-N ring] | R | R₂ | R' | Melting point (° C.) | λ max. (mμ) (in MeOH) |
|---|---|---|---|---|---|---|
| (20) | Same as above | —C₂H₅ | do | —CH₂CH₂OH | 260–262 | 526 |
| (21) | CH₃-, CH₃- benzoxazole C= | Same as above | do | —CH₂CH₂CH₂OH | 223–225 | 500 |
| (22) | CH₃, CH₃ gem-dimethyl indoline C= | —CH₃ | do | —CH₂CH₂OH | 193–196 | 498 |
| (23) | naphth[oxazole] C= | —C₂H₅ | do | Same as above | 293–295 | 508 |
| (24) | benzoxazole C= | Same as above | do | —CH₂CH₂CH₂OCH(CH₃)₂ | 220–223 | 497 |
| (25) | Same as above | —CH₂CH₂COOH | do | —CH₂CH₂OCH(CH₃)₂ | 235–238 | 490 |
| (26) | CH₃O- benzoxazole C= | —C₂H₅ | do | —CH₂CH₂CH₂OCH₃ | 211–214 | 500 |
| (27) | benzoxazole C= | Same as above | —C₆H₄—Cl | Same as above | 237–240 | 495 |
| (28) | CH₃O- benzoxazole C= | do | —C₆H₅ | —CH₂CH₂CN | 242–244 | 501 |
| (29) | Same as above | do | —C₆H₄—Cl | Same as above | 276–278 | 501 |
| (30) | do | do | —CH₂CH₂CH₃ | do | 210–212 | 496 |
| (31) | CH₃-, Cl- benzoxazole C= | —CH₃ | Same as above | do | 274–276 | 488 |
| (32) | CH₃O- benzoxazole C= | —C₂H₅ | —CH₂CH=CH₂ | do | 212–214 | 495 |
| (33) | benzoxazole C— | —CH₂CH₂COOH | —C₆H₅ | do | 248–251 | 490 |
| (34) | CH₃O- benzoxazole C= | —C₂H₅ | —CH₂—C₆H₅ | do | 227–230 | 496 |

TABLE—Continued
| Compound No. | <br>(Z-C-N ring) | R | R₂ | R' | Melting point (° C.) | λ max. (mμ) (in MeOH) |
|---|---|---|---|---|---|---|
| (35) | 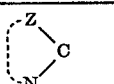 | Same as above | 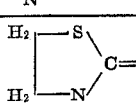 | do | 223–226 | 480 |
| (36) |  | 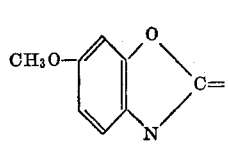 | Same as above | do | 251–252 | 495 |
| (37) | 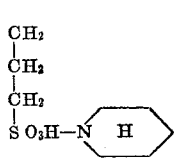 | —C₂H₅ | —CH₂CH=CH₂ | —CH₂CH₂CN | 170–172 | 624 |
| (38) | 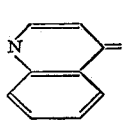 | Same as above |  | —CH₂CH₂COOH | 277–279 | 495 |
| (39) |  | do | Same as above | Same as above | 295–298 | 500 |
| (40) |  | do | do | do | 296–299 | 495 |
| (41) | 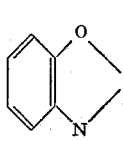 | do | do | do | 278–281 | 500 |
| (42) |  | do |  | do | 274–276 | 500 |
| (43) | 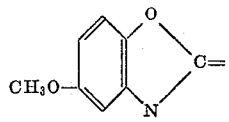 | do | Same as above | do | 283–285 | 493 |
| (44) | 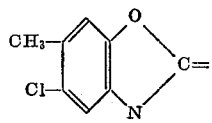 | do | —CH₂CH=CH₂ | do | 262–265 | 493 |
| (45) | 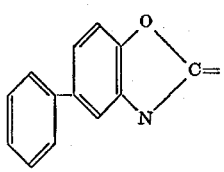 | do | 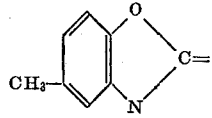 | do | 298–299 | 508 |
| (46) | Same as above | do |  | do | 261–264 | 507 |
| (47) | 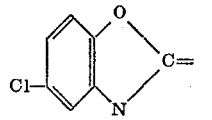 | do | —CH₂CH₂CH₃ | do | 266–269 | 493 |

TABLE—Continued

| Compound No. | <br>(Z-C-N ring) | R | R₂ | R' | Melting point (°C.) | λ max. (mμ) (in MeOH) |
|---|---|---|---|---|---|---|
| (48) |  | ...do... | —⌬ (phenyl) | ...do... | 293–296 | 530 |
| (49) | 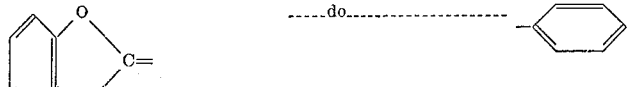 | ...do... | —CH₂CH₂CH₃ | ...do... | 237–240 | 475 |
| (50) | 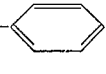 | ...do... | —⌬—Cl | —CH₂CH₂CONH₂ | >300 | 495 |
| (51) | 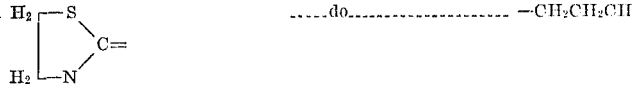 | ...do... | Same as above | Same as above | >300 | 503 |
| (52) | 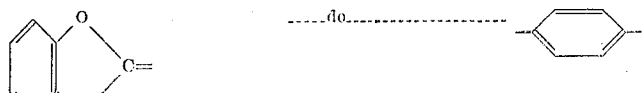 | ...do... | —CH₂CH₂CH₃ | ...do... | 279–282 | 486 |
| (53) |  | ...do... | —CH₂CH=CH₂ | ...do... | 241–243 | 493¹ |
| (54) | 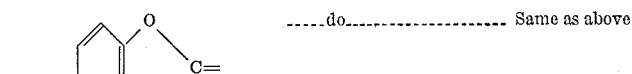 | ...do... | —CH₂—⌬ | ...do... | >300 | 490 |
| (55) | Same as above | ...do... | —⌬ | ...do... | >300 | 492 |

¹ Decomposition.

Now, the preparation of some of the aforementioned compounds is exemplified below.

Synthesis of compound 3

To 30.5 g. of monoethanolamine dissolved in 200 ml. of alcohol are added 46.5 g. of monochloroacetamide. The reaction mixture is refluxed on a water bath for one hour and 20 minutes. The solution is then allowed to stand for a while and a precipitated crystal is filtered off and alcohol is distilled off under reduced pressure. To the residue is added a solution of 300 ml. of methanol, 40 g. of phenyl isothiocyanate and 16.8 g. of caustic potash in 110 ml. of water and the resulting solution is refluxed for 3 hours and then cooled to room temperature. 47 ml. of concentrated hydrochloric acid is added to the solution and reflux is carried out for further 2 hours. Methanol is distilled off under reduced pressure. A crystal is formed by adding water and cooling. The crystal is filtered and washed with a little alcohol-ether to give 38 g. of crude crystal. Recrystallization from 160 ml. of alcohol yields 20 g. of 1-hydroxyethyl-3-phenyl - 2 - thiohydantoin as white flocculent crystal. 0.7 g. of the 1-hydroxyethyl-3-phenyl-2-thiohydantoin as reacted with 1.17 g. (0.003 mol) of 2 - β-anilidovinylbenzoxazole ethiodide in the presence of 0.3 g. of potassium acetate and 5 ml. of acetic anhydride in an oil bath at 135° C. for 7 minutes. To the cooled reaction mixture is then added water and crystal formed is filtered, washed with water and alcohol to obtain 1 g. of crude product. By the recrystallization from methanolpyridine, 0.73 g. of the above compound 3, 1-acetoxyethyl - 5 - [(3 - ethyl - 2(3) - benzoxazolylidene)-ethylidene]-3-phenyl-2-thiohydantoin is obtained as red crystal.

Synthesis of compound 5

To 10 ml. of absolute alcohol containing 0.3 g. of triethylamine are added 1.47 g. (0.003 mol) of 2-β-acetanilidovinyl-6-methoxy-benzoxazole ethiodide and 0.6 g. (0.003 mol) of 1-hydroxyethyl-3-propyl-2-thiohydantoin. The reaction mixture is refluxed on a water bath for 30 minutes and cooled. The precipitated crystal is filtered under suction, washed with alcohol and air dried. The resulting crude product is recrystallized from alcohol to give 0.63 g. of the above compound 5, 1-hydroxyethyl-5-[(3-ethyl-6-methoxy - 2(3) - benzoxazolylidene)-ethylidene]-3-propyl-2-thiohydantoin as orange red crystal.

Synthesis of compound 12

0.54 g. of 1-hydroxyethyl-3-p-chlorophenyl - 2 - thiohydantoin prepared by a procedure similar to that for 1-hydroxyethyl-3-phenyl-2-thiohydantoin and 0.77 g. of 2-β - anilidovinyl - benzoxazole carboxyethylbromide are added to 5 ml. of pyridine containing 0.2 g. of piperidine and refluxed for 45 minutes on an oil bath and then cooled. The reaction mixture is neutralized with 15% hydrochloric acid and crystallized. The resulting crystal is filtered and washed with water, alcohol and then ether to give 0.9 g. of crude product. Recrystallization of the crude product from alcohol-triethylamine and alcohol-hydrochloric acid yields 0.6 g. of the above compound 12, 1-hydroxyethyl-5-[(3-carboxyethyl - 2(3) - benzoxazolylidene)ethylidene]-3-p-chlorophenyl - 2 - thiohydantoin as red violet crystal.

Synthesis of compound 28

0.84 g. (0.002 mol) of 2-$\beta$-anilidovinyl-5-methoxy-benzoxazole ethiodide and 0.49 g. (0.002 mol) of 1-cyanoethyl-3-phenyl-2-thiohydantoin are added to 10 ml. of pyridine containing 0.2 g. of triethylamine and refluxed for 30 minutes on an oil bath. The reaction mixture is cooled and crystallized by adding water. The crystal formed is filtered and washed with alcohol to give 0.83 g. of crude product. By the recrystallization of the crude product from methanol-pyridine, 0.69 g. of the above compound 28, 1-cyanoethyl-5-[(3-ethyl-5-methoxy-2(3)-benzoxazolylidene)ethylidene] - 3 - phenyl - 2 - thiohydantoin is obtained as red crystal. M.P. 242°–244° C. $\lambda_{max}$ (in methanol) 501 m$\mu$.

*Elementary analysis.* — Found: N=12.80. Calcd.: N=12.54.

Synthesis of compound 38

1.17 g. of the 2-$\beta$-anilidovinyl-benzoxazole ethyl sulfate and 0.79 g. (0.003 mol) of 1-carboxyethyl-3-phenyl-2-thiohydantoin are added to 10 ml. of pyridine containing 0.3 g. of triethylamine and refluxed for 30 minutes on an oil bath. The reaction mixture is then acidified and cooled to 0° C. Crystal formed is filtered and washed with water, alcohol and ether to give 1.1 g. of crude product. This crude product is purified by dissolving it in alcohol-triethylamine solvent and acidifying it with diluted hydrochloric acid to crystallize and thus 0.65 g. of pure compound 38, 1-carboxyethyl - 5 - [(3-ethyl-2(3)-benzoxazolylidene)ethylidene] - 3 - phenyl - 2 - thiohydantoin is obtained. M.P. 277°–279° C. $\lambda_{max}$ (in methanol) 495 m$\mu$.

*Elementary analysis.* — Found: N=9.74. Calcd.: N=9.64.

Synthesis of compound 52

1.17 g. (0.003 mol) of 2-$\beta$-anilidovinyl-benzoxazole ethyl sulfate and 0.62 g. (0.003 mol) of 1-carbamoylethyl-3-n-propyl-2-thiohydantoin are refluxed for 30 minutes on an oil bath together with 15 ml. of pyridine containing 0.3 g. of triethylamine. Thereafter, the reaction mixture is cooled and crystal formed is filtered, washed with ether and dried to yield 0.9 g. of crude product. By the recrystallization from methanol-pyridine, 0.55 g. of the above compound 52, 1-carbamoylethyl-5-[(3-ethyl-2(3)-benzoxazolylidene)ethylidene]-3-n-propyl - 2 - thiohydantoin is obtained as red needle crystal. M.P. 279°–282° C. $\lambda_{max}$ (in methanol) 486 m$\mu$.

*Elementary analysis.* — Found: N=14.01. Calcd.: N=13.99.

The new polymethine merocyanine dye used in this invention is preferably added to photographic emulsion in an amount of 0.1–10 mg. per 100 g. of silver halide emulsion. However, this range is not critical and a greater or smaller amount may be used. As solvents, those ordinarily used such as methanol, ethanol, dimethyl sulfoxide and the like can be used. Addition of the dye to photographic emulsion may be made at any stage before, during or after the second ripening and preferably immediately after the second ripening. It is to be noted that use of the polymethine merocyanine dye according to this invention does not cause any adverse effect on photographic emulsion which is chemically sensitized by the noble metal-, sulfur-, reduction- and polyalkylene oxide-sensitizations and moreover by the supersensitization according to the method known per se. Further, the dye of the invention is applicable also to photographic emulsion containing an anionic wetting agent (surface active agent).

Emulsion sensitized with the new cyamine dye of this invention is coated on a support such as cellulose acetate, polyester film and baryta paper and dried to produce a light sensitive silver halide photographic material.

The new polymethine merocyanine dye used in this invention is applicable to ordinary (black-and-white) photographic emulsion as well as to multi-layer color photographic emulsion. Moreover, the polymethine merocyanine dye does not cause any interaction with a color former contained in the emulsion and not diffuse into an adjacent layer of the sensitive material. By using the new dye, color staining after development is avoided and desirable sensitization affecting no adverse effect on photographic characteristics can be attained.

The present invention is illustrated by the following examples.

EXAMPLE 1

A high-speed silver bromoiodide photographic emulsion containing 3 mol percent of silver iodide was prepared according to a neutral process. Immediately after the second ripening of the said emulsion, 100 g. each of the emulsion was added with 0.5 to 5 cc. of a methanolic solution containing 0.05% by weight of the compound specified in Table 1. Each of the thus resulted emulsions was coated on film bases and then dried under the same conditions.

Each of the light-sensitive photographic films as prepared above was exposed to light according to a JIS method (K 7609) and then treated with an NSG developer at 20° C. for 5 minutes. The said NSG developer has the following composition:

|   | G. |
|---|---|
| Monomethyl p-aminophenol sulfate | 3 |
| Sodium sulfate (anhydrous) | 50 |
| Hydroquinone | 6 |
| Sodium carbonate (monohydrate) | 30 |
| Potassium bromide | 1 |
| Water to make up to 2 litre. | |

The storageability of the developed films was determined by measuring photographic speed according to a JIS method (K 7609) after storage for certain period. Measurement of spectral sensibility was made by using a diffraction lattice type spectrophotometer (with a light source of 2848° K.) manufactured by Shimazu Mfg. Co., Ltd., Japan. The photographic properties and residual color density are set forth in Table 1, wherein photo-

TABLE 1

| | Amount used (cc./100g. emulsion) | Immediately after preparation of the emulsion | | | | Incubated at 55° C. for 3 days after the preparation | | | Incubated at 50° C. and 80% R.H. for 3 days after the preparation | | | Residual color density |
|---|---|---|---|---|---|---|---|---|---|---|---|---|
| | | Relative speed | | | Sensitization max. (m$\mu$) | Relative speed | | | Relative speed | | | |
| | | White light | Green light | Fog | | White light | Green light | Fog | White light | Green light | Fog | |
| Compound No.: | | | | | | | | | | | | |
| (1) | 2 | 100 | 115 | 0.03 | 545 | 105 | 115 | 0.03 | 105 | 110 | 0.03 | 0.03 |
| (2) | 2 | 105 | 130 | 0.02 | 545 | 110 | 135 | 0.03 | 100 | 130 | 0.02 | 0.02 |
| (6) | 2 | 110 | 140 | 0.02 | 550 | 110 | 140 | 0.03 | 105 | 135 | 0.02 | 0.02 |
| (7) | 2 | 105 | 120 | 0.02 | 545 | 115 | 125 | 0.03 | 110 | 125 | 0.03 | 0.04 |
| (14) | 1 | 108 | 110 | 0.03 | 545 | 110 | 120 | 0.04 | 110 | 110 | 0.03 | 0.03 |
| (29) | 2 | 107 | 125 | 0.04 | 550 | 108 | 125 | 0.05 | 105 | 120 | 0.04 | 0.06 |
| (33) | 2 | 105 | 120 | 0.03 | 545 | 105 | 120 | 0.03 | 105 | 120 | 0.03 | 0.03 |
| (40) | 5 | 112 | 145 | 0.04 | 545 | 110 | 145 | 0.05 | 110 | 140 | 0.04 | 0.03 |
| (43) | 2 | 100 | 105 | 0.03 | 545 | 102 | 110 | 0.04 | 100 | 105 | 0.03 | 0.03 |
| (52) | 3 | 105 | 120 | 0.03 | 540 | 105 | 115 | 0.04 | 103 | 110 | 0.03 | 0.04 |
| Control | 2 | 100 | 100 | 0.03 | 550 | 105 | 103 | 0.05 | 98 | 94 | 0.03 | 0.06 | graphic speed is expressed as a relative value in comparison with a photographic speed of a control film containing the optimum amount of 1-ethyl-5[3-methyl-2(3)-benzoxazolylidene - ethylidene]-3-phenyl-2-thiohydantoin, the speed of said control film being rated as 100.

to a JIS method (K 7609) and treated with a color developer in a usual manner. After bleaching and fixing, the film was subjected to sensitometry to determine photographic speed and fog. The test results are set forth in Table 3.

TABLE 3

| Compound No. | Amount used (cc./100 g. emulsion) | Immediately after preparation of the emulsion | | | Incubated at 40° C. for 3 hrs. after the preparation | | | Sensitization maximum (mμ) |
|---|---|---|---|---|---|---|---|---|
| | | Relative speed | | | Relative speed | | | |
| | | White light | Green light | Fog | White light | Green light | Fog | |
| (6) | 2 | 110 | 135 | 0.03 | 120 | 135 | 0 03 | 550 |
| (10) | 2 | 115 | 120 | 0.02 | 120 | 130 | 0.03 | 550 |
| (16) | 2 | 110 | 115 | 0.03 | 115 | 115 | 0.03 | 545 |
| (17) | 2 | 110 | 125 | 0.03 | 120 | 130 | 0.03 | 545 |
| (28) | 2 | 110 | 125 | 0.03 | 115 | 130 | 0.03 | 550 |
| (40) | 2 | 105 | 115 | 0.03 | 115 | 125 | 0.03 | 550 |
| (50) | 2 | 100 | 110 | 0.03 | 110 | 125 | 0.03 | 550 |
| Control | 2 | 100 | 100 | 0.03 | 108 | 103 | 0.03 | 550 |

As apparent from the above table, the light-sensitive photographic materials of the invention are safe from fogging and dye staining and they are excellent in photographic sensitivity.

Figure 3:
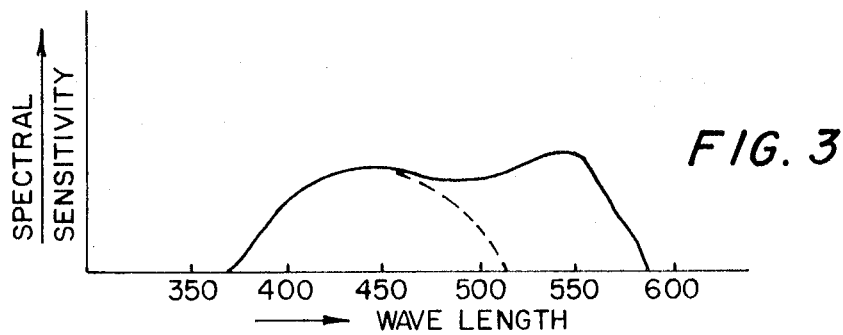

In FIG. 1 and FIG. 3, the spectral sensibility curves of the emulsions added with the compound 6 and the compound 40, respectively, are shown by solid lines. In these figures, the spectral sensibility curves of the control emulsion are indicated by dotted lines.

EXAMPLE 2

100 g. each of a low speed light-sensitive silver chlorobromide photographic-positive emulsion was added with an optimum amount (0.5–5 cc.) of a methanolic solution containing 0.05% by weight of the compound specified in Table 2. The emulsion was coated on a film base and then dried. The thus obtained light-sensitive film was subjected to sensitometry. The test results are set forth in Table 2.

TABLE 2

| Compound No.: | Amount used (cc./100 g. emulsion) | Relative speed | | Fog | Sensitization maximum (mμ) |
|---|---|---|---|---|---|
| | | White light | Green light | | |
| (3) | 2 | 230 | 120 | 0.02 | 545 |
| (12) | 2 | 215 | 110 | 0.02 | 545 |
| (22) | 2 | 200 | 90 | 0.03 | 530 |
| (26) | 2 | 220 | 100 | 0.03 | 550 |
| (34) | 2 | 220 | 105 | 0.02 | 550 |
| (39) | 2 | 260 | 145 | 0.02 | 540 |
| (41) | 2 | 250 | 140 | 0.02 | 540 |
| (49) | 2 | 230 | 110 | 0.03 | 540 |
| Control | | 100 | 0 | 0.02 | |

As apparent from the above table, the light-sensitive photographic materials of the present invention are safe from fogging and color staining and excellent in photographic sensitivity.

Figure 2:
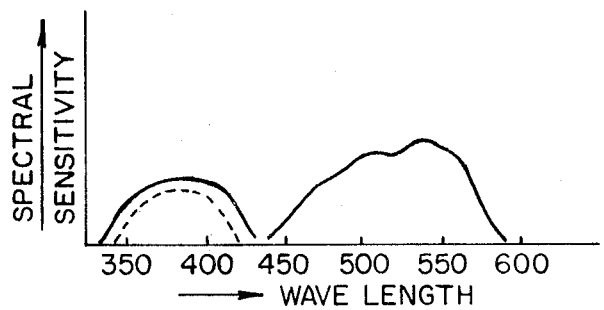
Figure 4:
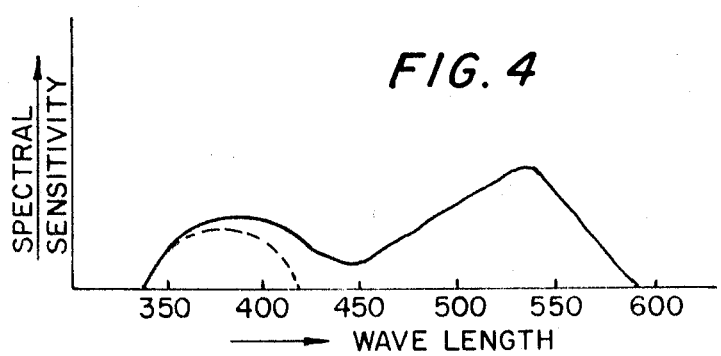

The spectral sensibility curves of the emulsions added with the compound 12 and the compound 39 are shown by solid lines, in FIG. 2 and FIG. 4, respectively. In these figures, the spectral curves of the control emulsion are indicated by dotted lines.

EXAMPLE 3

100 g. of the high-speed light-sensitive silver bromoiodide emulsion used in Example 1 was added with up to 5 cc. of a methanolic solution containing 0.05% by weight of the compound specified in Table 3. Into the resulting emulsion, 1-(4-phenoxy-3-sulfophenyl)-3-heptadecyl-5-pyrazolone as a color former was dispersed. The dispersion was adjusted at pH 6.8. Immediately thereafter or after incubation at 40° C. for 3 hours, the green-sensitive color-photographic emulsion thus prepared was coated on a film base and then dried. The light-sensitive color-photographic film was exposed to light according It is apparent from the above data that the light-sensitive photographic materials of the invention are safe from fogging and are well sensitized through an interaction of a sensitizing dye with a color former.

What we claim is:

1. A light-sensitive silver halide photographic material characterized by containing, as an ingredient for its photographic emulsion layer, a sensitizing dye of the general formula:

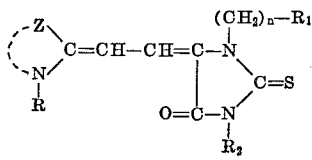

wherein R is an alkyl group, a carboxy alkyl group or a sulfo alkyl group; $R_1$ is hydroxy, cyano, alkoxy, carboxy, acyloxy or carbamoyl; n is an integer of 2 to 3; $R_2$ is an alkyl, aryl, alkenyl or aralkyl; and Z means an atomic grouping capable of forming, together with the adjacent nitrogen and carbon atoms, a benzoxazole ring, a naphthoxazole ring, a thiazole ring, an indolenine ring or a quinoline ring.

2. The light-sensitive silver halide photographic material as claimed in claim 1; said photographic emulsion layer further comprising a member selected from the group consisting of sulfur-, gold-, polyoxyalkylene- and reductive sensitizers.

3. The light-sensitive silver halide photographic material as claimed in claim 1; said photographic emulsion layer further comprising a color former.

4. The light-sensitive silver halide photographic material as claimed in claim 3 wherein said color former is a magenta coupler having an indazolone or pyrazolone nucleus.

5. The light-sensitive silver halide photographic material as claimed in claim 1, said photographic emulsion layer further comprising 1-hydroxyethyl-5-[(3-sulfopropyl-2(3)-benzoxazolylidene)-ethylidene] - 3 - phenyl-2-thiohydantoin piperidinium salt or 1-carboxyethyl-5-[(3 - ethyl - 2(3) - benzoxazolylidene)-ethylidene] - 3-phenyl-2-thiohydantoin.

References Cited

UNITED STATES PATENTS 2,493,748  1/1950  Brooker et al. _____ 96—102
2,497,876  2/1950  Fallesen et al. _____ 96—102
2,828,203  3/1958  MacWilliam _____ 96—102

J. TRAVIS BROWN, Primary Examiner

U.S. Cl. X.R.

96—107, 108, 122, 142